United States Patent

[11] 3,588,192

| [72] | Inventors | Gilbert H. Drutchas;<br>Hubert M. Clark, Birmingham; David D. Campbell, Detroit, Mich. |
|---|---|---|
| [21] | Appl. No. | 829,325 |
| [22] | Filed | June 2, 1969 |
| [45] | Patented | June 28, 1971 |
| [73] | Assignee | TRW Inc.<br>Cleveland, Ohio |

[54] HYDRAULIC SKID CONTROL SYSTEM
9 Claims, 3 Drawing Figs.
[52] U.S. Cl. .................................................. 303/21F,
188/181A, 303/10, 303/13
[51] Int. Cl. .................................................. B60t 8/06,
B60t 13/16
[50] Field of Search............................................ 303/10, 6,
21, 24, 68—69, 61—63, 13; 60/54.5, 54.5 (P);
188/181

[56] References Cited
UNITED STATES PATENTS

| 3,032,995 | 5/1962 | Knowles | 303/21UX |
| 3,124,220 | 3/1964 | Kell | 303/21X |
| 3,276,822 | 10/1966 | Lister et al. | 303/21UX |
| 3,463,555 | 8/1969 | Ryskamp | 303/21 |

*Primary Examiner*—Trygve M. Blix
*Assistant Examiner*—John J. McLaughlin
*Attorney*—Hill, Sherman, Meroni, Gross & Simpson ABSTRACT: A hydraulic skid control valving circuit having a hydraulic pump driven in proportion to the speed of a vehicle wheel and developing a fluid pressure in response thereto. A pump return is provided, and all of the pump output is coupled to the pump return when braking action is not desired. A spool valve is provided, and output pressure from the master cylinder is used to actuate the spool valve into a throttling action with the pump return. When the pump return is throttled, the pump output increases, and this pressure is sufficient to be utilized as the principal braking force. A second spool valve is provided to normally cut off the pump output from the brake motor means. However, when the throttling of the pump return occurs, the pump output increases sufficiently to move the spool valve into a position which allows the pump output to be connected directly to the brake motor means. The system is fail-safe since in the absence of pump pressure the second spool valve moves into a position for coupling the output of the master cylinder directly to the rear brake motor means. When the pump pressure is coupled directly to the motor means a closed hydraulic mechanical circuit is provided wherein the rate of rotation of the vehicle wheels generates a pressure signal at the pump output which may be said to be the sensor signal. This sensor signal is also the signal which is used to apply the brakes. As the wheels begin to decelerate due to the braking action, the pump pressure reduces, and as wheel lock occurs, the pump pressure reduces to the point where the brakes are then released.

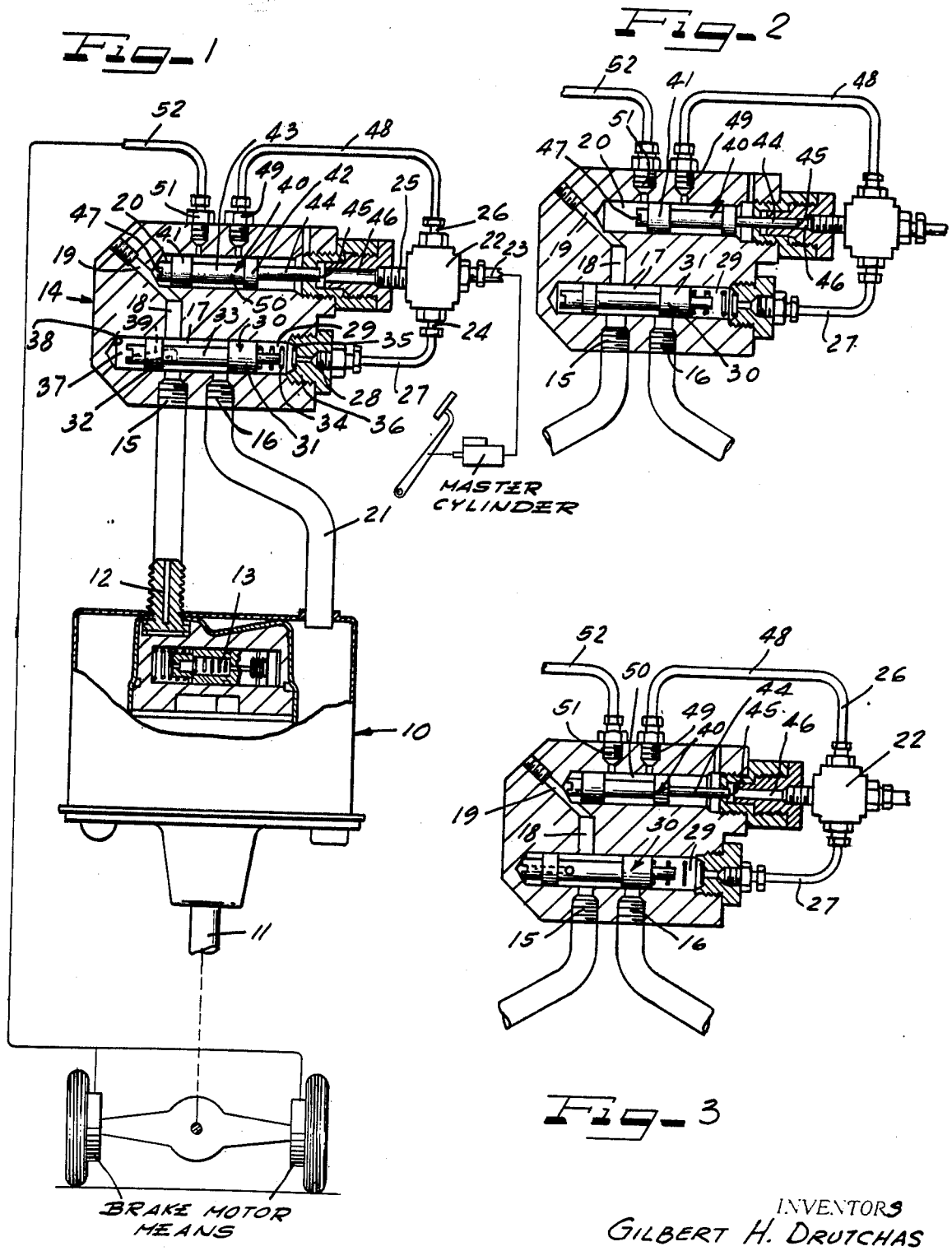

3,588,192

HYDRAULIC SKID CONTROL SYSTEM

BACKGROUND OF THE INVENTION

Field of the Invention

The field of art to which this invention pertains is skid control devices for vehicles and in particular to hydraulic skid control devices utilizing pump output pressure directly to both sense the wheel speed and to actuate the wheel brakes. This invention also relates to valving means for applying such a pump output pressure to rear brake motor means and to insure fail-safe operation of the system.

SUMMARY OF THE INVENTION

It is an important feature of the present invention to provide a hydraulic antiskid brake system.

It is another feature of the present invention to provide a valving circuit for a hydraulic antiskid or antiwheel lock system.

It is an object of the present invention to provide a hydraulic skid control valving circuit for use in a vehicle for controlling the rotation of the vehicle wheels and for preventing undesirable skid or wheel lock conditions.

It is another object of this invention to provide a pressure signal which is proportional to wheel speed and to provide a valving means for throttling the pressure signal to a fluid sink in order to regulate the useable output pressure for controlling the vehicle brakes.

It is also an object of this invention to provide a valving arrangement for a hydraulic skid control system which includes a master cylinder connection to a spool valve wherein the spool valve is used for throttling a pump return to control the pressure delivered to the hydraulic braking circuit.

It is a further object of this invention to provide a hydraulic skid control valving circuit of the type described above wherein the master cylinder output pressure is capable of being connected directly to the rear brakes in the absence of output pump pressure and wherein increases in output pump pressure causes a spool valve to disconnect the master cylinder pressure from the rear brakes and to connect the pump pressure directly to the rear brakes thereby actuating the skid control system.

It is an additional object of this invention to provide a pair of spool valves for a hydraulic skid control valving circuit wherein one of the spool valves is used to throttle a pump return and is biased into a throttle position by pressure from the master cylinder so that the biasing force is greater than the pump output pressure and wherein the second spool valve is biased by the master cylinder to couple the master cylinder pressure directly to the rear brakes wherein the second spool valve is moved against the biasing force of the master cylinder by the pump output pressure due to an area differential at opposing ends of the spool valve.

It is a further object of the present invention to provide a hydraulic antiskid brake system wherein the hydraulic fluid is both the sensing means and the brake actuator means and wherein master cylinder brake pressure is used to actuate the antiskid system by throttling a pump output and increasing the pump pressure to move a crossover valve so as to expose the rear brake motor means directly to the pump pressure and sensing device.

These and other objects, features and advantages of the present invention will be understood in greater detail from the following description and the associated drawing wherein reference numerals are utilized to designate an illustrative embodiment.

BRIEF DESCRIPTION OF THE DRAWING

FIG. 11 is a partially sectioned view of a skid control device according to the present invention showing the pump circuit, the pump output and pump return and the means for throttling the pump return in response to master cylinder pressure. FIG. 1 also shows the crossover valve for connecting and disconnecting the master cylinder to the rear brakes in accordance with the level of pump pressure received thereat.

FIG. 2 is a sectional view of the valving circuit of FIG. 1 showing the positioning of the spool valves therein when the brakes are applied and the vehicle is moving in the forward direction. In FIG. 2, the spool valves have been shifted to apply pressure from the pump directly to the wheel brake cylinders.

FIG. 3 is a sectional view similar to the view shown in FIG. 2 and illustrates the fail-safe feature of the present invention and in particular shows the positioning of the spool valves when there is a lack of pressure from the pump output. FIG. 3 corresponds to a circumstance wherein the brakes are applied and there is inadequate pump pressure to operate the rear wheel cylinders.

DESCRIPTION OF THE PREFERRED EMBODIMENT

The antiskid brake system of the present invention utilizes a hydraulic pump which develops a fluid pressure in proportion to the speed of rotation of at least one of the vehicle wheels. When braking action is not desired, the output of the pump is bypassed to a pump return, and the output pressure is maintained at a low level. However, when braking action is desired, the pump return is throttled, thereby increasing the pump output pressure. This increased pump output pressure is then utilized to shuttle a crossover spool valve and connect the pump pressure directly to the rear brake wheel cylinders. The spool valve is normally positioned so that the pump output is disconnected from the rear wheel brake cylinders. During that time the master cylinder output is coupled directly to the rear wheel brake cylinder.

The throttling of the pump return is accomplished by a second spool valve, and the master cylinder output pressure is used to move the spool valve into a throttling engagement with the pump return. The spool valve moves against the build up in pressure of the pump output due to the higher actuating force of the master cylinder. In contrast, the first mentioned spool valve does not move against the hydraulic pressure of the pump output because a ratio of approximately 1 to 7 is provided in the areas of the spool valve which are susceptible to the master cylinder pressure and the pump output pressure respectively. Through this technique, the master cylinder pressure would be required to be seven times the pump pressure in order to overcome the pump pressure.

The use of the spool valve arrangement as described provides a fail-safe feature in that when there is a low output pump pressure, the first mentioned spool valve moves in such a way to connect the master cylinder directly to the rear brakes thereby providing a normal braking action without the skid control.

The skid control itself is accomplished by means of a hydraulic mechanical closed loop feedback circuit. This circuit consists of the vehicle wheel which is used to rotate the pump and hence develop a fluid pressure in response to the wheel speed. The fluid pressure is then used as an indicator of wheel speed and also as a means for applying the wheel brakes. Hence as wheel lock begins, the hydraulic pressure begins to reduce since the wheel speed is being reduced. However, as the wheel begins to rotate again, the pump pressure increases thereby tending to reengage the brake and slow down the vehicle.

Referring to the drawing in more detail, FIG. 1 shows a pump 10 which has a shaft 11 coupled directly to one of the vehicle wheels. In this way, the pump output at 12 is directly related to the speed of rotation of the associated wheel. An internal flow control valve 13 may be used to assure that fluid pressures do not rapidly increase within the system. However, the valve 13 is not part of the present invention, and the use of the valve 13 is not a necessary part of the present invention.

It suffices to say that the pump 10 develops an output pressure 12 which is proportional to the speed of one of the vehicle wheels. A valve body 14 has an inlet 15 and an outlet 16. Fluid from the pump output 12 is received at the inlet 15 and is coupled to a cavity 17 formed interiorly of the housing 14. The cavity 17 communicates with a passageway 18 and a further passageway 19 which in turn is coupled directly to a cavity 20.

The fluid pressure within the cavity 17 is returned directly to the pump return 16 which in turn couples via a fluid line 21 directly to the pump 10. So long as the pump return 16 is open, fluid will pass from the outlet 12 and 15 directly into the return 16 and 21, and output pressure will be at a minimum.

However, should fluid be interrupted from flowing to the pump return 16, it is apparent that pressure within the cavity 17 and passageways 18, 19 and 20 would rapidly increase.

A connection 22 from the master cylinder has an inlet 23 from the master cylinder which may be actuated by a vehicle operator and has three outlets 24, 25 and 26. The outlet 24 is coupled through a line 27 to an inlet 28 which lead directly to a cavity 29 within the valve housing 14.

A spool valve 30 has radially enlarged portions 31 and 32 and an interconnecting rod 33. The spool valve 30 has a coil spring 34 which is coupled between the radially enlarged portion 31 and a seat 35 which is formed within a pipe fitting 36.

The enlarged portion 32 helps define a cavity 37 between an end wall 38 and the radially enlarged portion 32. It is apparent that if the spool valve 30 moves to the left, means must be provided to release pressure from the cavity 37. Such means takes the form of a pressure relief passageway 39 which is formed from the end of the rod 33 and through the rod as shown by the dashed lines.

When it is desired to apply the brakes, the vehicle operator depresses the brake pedal and thereby actuates the master cylinder which ingresses into inlet 23 of fitting 22. Pressure from the master cylinder is received through the line 27 and into the cavity 29. Pressure from the master cylinder then acts against the radially enlarged portion 31 of the spool valve 30 tending to cause the spool valve to move to the left. When this occurs, the radially enlarged portion 31 tends to restrict the flow of fluid into the pump return 16 and thereby generates an increase in fluid pressure in the passageways 18 and 19 and in the cavity 20.

A second spool valve 40 is provided and has radially enlarged portions 41 and 42 which operates as a crossover valve means in supplying pressurized fluid from the pump circuit to the brake motor means, or, alternatively, pressure for the master brake cylinder. The spool valve 40 an interconnecting rod 43.

The rod 43 has an extension portion 44 terminating at an end face 45. Master cylinder pressure from the master cylinder acting through fitting 22 and thence through a passageway 46 on the end face 45 tends to bias the spool valve toward the left. However, pressure within the passageway 19 acts on the entire end face 47 of the spool valve. The area of the entire end face 47 is approximately seven times the area of the end face 45, and accordingly when throttling of the pump return 16 occurs, pump pressure acting on the end face 47 moves the spool valve 40 to the right against the biasing force of the master cylinder.

It can be seen from FIG. 1 that the master cylinder output 26 is coupled through a line 48 and a fitting 49 to a cavity 50. The cavity 50 is in turn coupled to a second fitting 51 and to a further line 52 which in turn is coupled to the rear wheel brake cylinders.

Accordingly when the spool valve 40 is in the position shown in FIG. 1, master cylinder pressure is coupled directly through the lines 48 and 52 to the rear wheel brake cylinders. However, it is apparent that when pump pressure increases in the passageway 19, the spool valve will move to the right thereby opening the pump pressure directly to the line 52 and closing off the master cylinder pressure from the line 48.

In FIG. 2, the spool valves 30 and 40 are shown moved into position corresponding to the circumstance where the brakes are applied, and the vehicle is moving in a forward direction. With the vehicle moving in a forward direction, pump pressure is received within the inlet 15 and is coupled directly to the cavity 17. This pressure is also felt in the passageways 18 and 19.

Pressure from the master cylinder received at fitting 22 flows through the line 27 to the cavity 29 and acts on the enlarged portion 31 of the spool valve 30 to move the spool valve to the left. Accordingly the radially enlarged portion 31 throttles the outlet 16 as shown and significantly increases the pressure in the passageways 18 and 19.

This increase in pressure is felt in the cavity 20 and acts on the end face 47 of the spool valve 40 to move the same to the right thereby opening communication between the passageway 20 and an outlet 51 which in turn communicates with a hydraulic line 52 leading to the rear wheel brake cylinders. Also, the spool valve disconnects the communication between the hydraulic line 48 and the hydraulic line 52. This is accomplished by placing the radially enlarged portion 41 between the inlets and outlets 49 and 51 respectively. As explained, the pressure in the cavity 20 is less per unit area than the hydraulic pressure within the inlet 46. However, the end face 45 of the rod or piston 44 is only one-seventh approximately of the area of the end face 47, and accordingly the spool valve 40 moves to the right, while the spool valve 30 moves to the left.

FIG. 3 shows the fail-safe feature of the present invention and includes the condition where pressure at the inlet 15 reduces to a too low level to actuate the rear wheel brake cylinders. Under this condition, the spool valve 30 moves entirely to the left in shutting off the outlet 16. This movement to the left, of course, is accomplished by pressure received from the master cylinder 22 through the line 27 into the cavity 29.

Since pressure at the inlet 15 is minimal, likewise, pressure in the passageways 18 and 19 will also be at a minimum. This means that the spool valve 40 will not move to the right, but rather will move to the left under the influence of master cylinder pressure in the cavity 46 acting on the face 45 of the piston or rod 44. When the spool moves to the left, master cylinder pressure from the outlet 26 is coupled through a hydraulic line 48 to the inlet 49 and further to the cavity 50. Master cylinder pressure from the the cavity 50 is then coupled through the outlet 51 and the hydraulic line 52 through the rear wheel brakes. In this way conventional master cylinder braking is achieved.

In the position shown in FIG. 2, skid control is obtained since the output pump pressure is fed directly to the rear wheel brake cylinders. Hence the braking force is controlled by the wheel speed itself through the medium of the pump and the hydraulic fluid circuit.

We claim:

1. In a vehicle having wheels for moving along a surface and including brake motor means and brake applicator means actuable by a vehicle operator for engaging said brake motor means, a hydraulic skid control fluid-valving circuit comprising:

pump means for generating a fluid pressure in said valving circuit in proportion to the rate of rotating of the vehicle wheels;

said pump means having an output and a return bypassing said fluid circuit;

means for throttling said pump return to selectively increase the pressure at said pump output and in said fluid circuit, said throttling means being actuated by said brake applicator means;

said fluid circuit being coupled to said brake motor means, whereby operation of said brake applicator means causes an increase in pressure to actuate said brake motor means, whereby tendency of the vehicle wheels to lock causes a reduction in pump pressure to release the brake motor means and prevent vehicle skid;

said throttling means comprising a spool valve and a separate fluid circuit provided from said brake applicator means to said spool valve wherein operation of said brake applicator means exerts pressure on said spool valve to move the same into a throttling position with said pump return;

said separate fluid circuit normally communicating with said brake motor means; and valve means to break said communication with said brake motor means in response to the throttling of said pump return, said valve means comprising a second spool valve operable by pressure from said separate circuit to maintain the communication of said separate circuit with said brake motor means and operable by pressure from said pump output to break said communication of said separate circuit with said brake motor means.

2. In a vehicle having wheels for moving along a surface and including brake motor means and brake applicator means actuable by a vehicle operator for engaging said brake motor means, a hydraulic skid control fluid valving circuit comprising:

a fluid pump having a pump output and a pump return and being rotated at a speed which is proportional to the speed of the vehicle wheels;

said pump output being normally bypassed directly into said pump return;

a fluid passageway extending from said pump output to said brake motor means;

first valve means normally closing communication through said passageway;

second valve means for throttling said pump return when a braking action is desired;

said first valve means being responsive to the throttling of said pump return to open communication of said pump output to said brake motor means; and a brake master cylinder, said brake applicator means being coupled to said master cylinder;

said master cylinder having an output coupled to said second valve means for moving the same into a throttling position with said pump return when said brake applicator is moved by the vehicle operator, said first and second valves comprising spool valves, said master cylinder having an output coupled to both said spool valves, master cylinder pressure biasing said first spool valve in a direction for closing off communication of said pump output with said brake motor means, master cylinder pressure biasing said second spool valve in a direction for throttling said pump return, the biasing force on said first spool valve being substantially less than the biasing force on said second spool valve, the pump output pressure having a magnitude relative to said respective biasing forces in said spool valves to overcome the biasing force on said first spool valve and to be insufficient to overcome the biasing force on said second spool valve during throttling of said pump return.

3. A hydraulic skid control fluid valving circuit in accordance with claim 2 wherein in the absence of throttling of said pump return said master cylinder normally communicates with said brake motor means and when throttling occurs the force exerted on said first spool valve from said pump output causes said spool valve to move in a direction to simultaneously open said pump output to said brake motor means and close the communication of said master cylinder with said brake motor means.

4. The method of supplying an antiskid braking pressure to a vehicle brake motor means comprising the steps of:

developing a fluid pressure output in proportion to the instantaneous speed of a vehicle wheel;

bypassing the fluid pressure away from the vehicle brake motor means when braking is not desired;

throttling the bypassed fluid to increase the fluid pressure when breaking is desired;

using the increased fluid pressure to open the fluid pressure output to the brake motor means, whereby a fluid-mechanical circuit is completed with the vehicle wheel producing a fluid pressure in proportion to wheel speed wherein said fluid pressure is in turn tending to reduce the vehicle speed;

using brake master cylinder pressure to throttle the fluid bypass;

coupling the master cylinder pressure to the brake motor means during pump output bypass and under all low pump output pressure conditions; and using the pump output after throttling to disconnect the coupling of the master cylinder pressure to the brake motor means and to connect the pump output to the brake motor means.

5. The method of wheeled vehicular braking with hydraulic skid control which includes the steps of:

confining a supply of fluid in a closed hydraulic circuit;

at one point in the circuit pressurizing the fluid as a function of rotational wheel speed to drive the fluid through the circuit in the form of a stream wherein the pressure varies as the rotational wheel speed varies;

at a second point in the circuit recirculating the pressurized stream to said one point;

at a third point in the circuit communicating the pressurized stream to a wheel-braking circuit;

throttling the stream between said second and third points to selectively direct pressurized fluid into the braking circuit;

generating master cylinder pressure by a selective operator actuation in response to braking needs;

controlling the throttling step with said master cylinder pressure;

at one point in said wheel-braking circuit selectively supplying master cylinder pressure; and cutting off said master cylinder pressure at said one point in said wheel-braking circuit as a function of the availability of pressurized fluid from said closed hydraulic circuit, whereby operation of said motor brake means in the braking circuit will normally be effected by pump-generated pressure but fail-safe operation by master cylinder pressure is assured.

6. Hydraulic braking means with skid control for a wheeled vehicle comprising a master cylinder means;

means forming a closed hydraulic circuit;

a pump at one point in said circuit driven as a function of rotational wheel speed, thereby driving the fluid in the circuit in the form of a stream at pressures which vary with the wheel speed;

a wheel-braking means connected to a second point in said closed hydraulic circuit;

a bypass at a third point in said closed hydraulic circuit connected to the inlet of said pump;

a throttling valve in said circuit responsive to master brake cylinder generated pressure for throttling fluid between said second point and said third point, said wheel braking means comprising;

crossover valve means receiving master brake cylinder generated pressure and pump-generated pressure for supplying the pump-generated pressure to said wheel braking means for actuation thereof, but supplying master cylinder-generated pressure to said wheel-braking means whenever pump-generated pressure is not available, thereby insuring fail-safe operation.

7. A vehicular braking system with skid control comprising:

a pump driven as a function of vehicular wheel speed;

a master cylinder actuated by an operator selectively;

a valve housing having first and second valve bores formed therein;

said first valve bore having an inlet opening receiving the discharge from said pump;

a bypass opening directing the return of fluid to the pump, and an outlet opening for directing fluid to a point of utilization;

a first valve spool in said first valve bore having valve surfaces for controlling the flow of fluid from said inlet opening to said bypass opening and to said outlet opening;

said second valve bore having a first inlet opening receiving fluid from said outlet opening of said first valve bore, a second inlet opening receiving fluid from said master cylinder, and an outlet opening for directing fluid to a brake motor means, a second spool valve in said second valve bore having valve surfaces for controlling the flow of fluid from either said first or second inlet openings to the brake motor means;

and means for applying master cylinder generated pressure to said first spool valve, whereby the flow of pressurized fluid to the second valve bore will be controlled as a function of master cylinder-generated pressure.

8. A vehicular braking system as defined in Claim 7 and further characterized by:

means for applying master cylinder generated pressure and pump-generated pressure to opposite ends of said second spool valve, but in differently proportioned amounts, whereby said second spool valve will close said second inlet opening whenever pump-generated pressure is available for braking but will open said second inlet opening for fail-safe operation in the absence of pump-generated pressure.

9. A vehicular braking system as defined in claim 8 wherein said second spool valve has action surfaces at opposite ends proportioned in the order of about an area differential of 1 to 7 so that master cylinder pressure must be correspondingly greater than pump pressure before said second inlet opening is closed.